United States Patent [19]
Bishop, Jr. et al.

[11] Patent Number: 6,002,929
[45] Date of Patent: Dec. 14, 1999

[54] EXCHANGE WHICH EXTENDS SIM BASED AUTHENTICATION AND METHOD THEREFOR

[75] Inventors: James William Bishop, Jr., Chandler; Steve Magee, Scottsdale, both of Ariz.; Nathan Miller, Santa Rosa, Calif.

[73] Assignee: Mototrola, Inc., Schaumburg, Ill.

[21] Appl. No.: 08/939,890

[22] Filed: Sep. 29, 1997

[51] Int. Cl.[6] .............................. H04M 11/00; H04Q 7/32
[52] U.S. Cl. .................... 455/431; 455/411; 455/558; 455/410
[58] Field of Search .................................. 455/411, 410, 455/408, 407, 425, 431, 558, 551

[56] References Cited

U.S. PATENT DOCUMENTS

| | | | |
|---|---|---|---|
| 4,811,377 | 3/1989 | Krolopp et al. | 379/62 |
| 5,438,610 | 8/1995 | Bhagat et al. | 379/58 |
| 5,497,411 | 3/1996 | Pellerin | 379/59 |
| 5,519,761 | 5/1996 | Gilhousen | 379/59 |
| 5,765,105 | 6/1998 | Kuriki | 455/410 |
| 5,819,176 | 10/1998 | Rast | 455/422 |
| 5,875,404 | 2/1999 | Messiet | 455/558 |

Primary Examiner—Dwayne D. Bost
Assistant Examiner—Joy Redmon
Attorney, Agent, or Firm—Harold C. McGurk; Timonthy J. Lorenz

[57] ABSTRACT

An on-board aircraft telecommunication exchange (32) provides communication and authentication services for M subscriber identity modules (SIMs) using N transceivers (36), where M can be greater than N. Associations between SIMs (56) and transceivers (36) are established when needed. Accordingly, a pool of transceivers 36 is provided to serve the collective needs of many subscribers. A SIM-based authentication process is performed (100) using a subscriber's original SIM (56). That authentication can be extended to a temporary SIM (106) that is substituted for the original SIM throughout the remainder of a flight. Alternatively, the original SIMs (56) may be locked in place and relinquished when a subscriber provides an appropriate PIN.

19 Claims, 6 Drawing Sheets

EXEMPLARY CALL ASSOCIATION TABLE

| SIM No. | SEAT BACK HANDSET No. | PIN | ISDN | TRANSCEIVER No. |
|---|---|---|---|---|
| 1 | 22-B | 5821 | WW-XXX-YYY-ZZZZ | 2 |
| 2 | — | — | — | — |
| 3 | — | — | — | — |
| 4 | — | — | — | — |
| 5 | — | — | — | — |
| 6 | — | — | — | — |
| 7 | — | — | — | — |
| 8 | — | — | — | — |
| M | — | — | — | — |

*FIG. 4*

AVAILABILITY LIST OF TRANSCEIVERS

| | |
|---|---|
| 1 | AVAILABLE |
| 2 | NOT AVAILABLE |
| 3 | AVAILABLE |
| 4 | RESERVED |
| 5 | AVAILABLE |
| ⋮ | |
| N | AVAILABLE |

EXCHANGE WHICH EXTENDS SIM BASED AUTHENTICATION AND METHOD THEREFOR

FIELD OF THE INVENTION

The present invention relates generally to the field of communication systems. More specifically, the present invention relates to communication systems that use subscriber identity modules (SIMs) to establish authentication.

BACKGROUND OF THE INVENTION

Modem cellular communication systems, such as GSM, the IRIDIUM® system and others, use subscriber identity module (SIM) cards to personalize radio units into which the SIM cards are installed. The personality given to a radio unit by a SIM card makes that radio unit serve the needs of the subscriber who owns the SIM card. Conventional SIM cards are smart cards which include subscriber-specific data and a processing capability. The data may define an international subscriber directory number (ISDN) or phone number, a subscriber's memorized speed dialing numbers, the identity of the subscriber, specific radio unit features to which the subscriber has subscribed, and a cryptographic security key.

Cellular communication systems require SIM cards in order to deliver communication services. For example, radio units are informed of incoming or terminating calls by ring alert or paging radio signals that convey ISDNs or TMSIs (temporary mobile subscriber identities). The presence and use of a SIM card is conventionally required in a particular radio unit so the radio unit will know which ISDN represents an incoming call to that particular radio unit.

The SIM card is also conventionally required as an integral part of system security. An authentication process is performed during registration and prior to servicing incoming and outgoing calls. Only if the authentication process is successful will the registration or call be allowed to take place. Typically, the system initiates the authentication process by issuing a random number to the SIM card being tested for authenticity. The processor on the SIM card then uses this random number, its internal cryptographic security key, and an encryption process performed by the SIM card to generate a response. The SIM response is sent back to the cellular system where it is tested for validity. If the cellular system determines that the SIM response is correct, the SIM card is declared valid.

To maintain system security, the SIM card is constructed so that its cryptographic security key cannot be read from or otherwise divulged by the SIM card. Because of this, a SIM card cannot be easily duplicated. Thus, the SIM card allows the system to provide authentication services in addition to communication services. The authentication services reduce the theft of communication services by unauthorized persons, allowing legitimate subscribers to enjoy reduced costs and better service quality as a result. The SIM card is a valuable item because it provides the key which unlocks communication services for which the subscriber will be billed. However, if the SIM card becomes lost or stolen, it may be fraudulently used to steal communication services using almost any radio unit.

As a consequence of the integration of SIM cards into the operation of cellular systems, a one-to-one correspondence between a SIM card and a radio unit conventionally results. This is because the SIM card is conventionally required to register and to make incoming and outgoing calls, and a radio unit can do very little without the SIM card being present.

Unfortunately, this one-to-one correspondence poses a problem for certain applications, such as public phone exchanges. One such application is a public phone exchange located in an aircraft. In an aircraft a subscriber's cellular phone may be unusable because the aircraft body may severely attenuate radio signals. A public exchange may be usable because an antenna for such an exchange may be located outside the aircraft body. Moreover, it would be desirable for a subscriber to use his or her SIM card with the public exchange so that billing records are kept straight and so that incoming calls may be directed to the user's ISDN. However, the one-to-one correspondence between SIM cards and transceivers would require a radio unit or transceiver for each subscriber wishing to take advantage of such a public phone exchange. Moreover, a public exchange which uses subscriber-provided SIM cards risks weakening security for the system and its subscribers because the SIM cards would be used in a public rather than private phone.

Accordingly, a need exists for a public phone exchange and method which extends the authentication services provided by the use of SIM cards without significantly weakening security and without requiring the inefficiency of a one-to-one correspondence between SIM cards and transceivers.

DETAILED DESCRIPTION OF THE DRAWINGS

Figure 1:
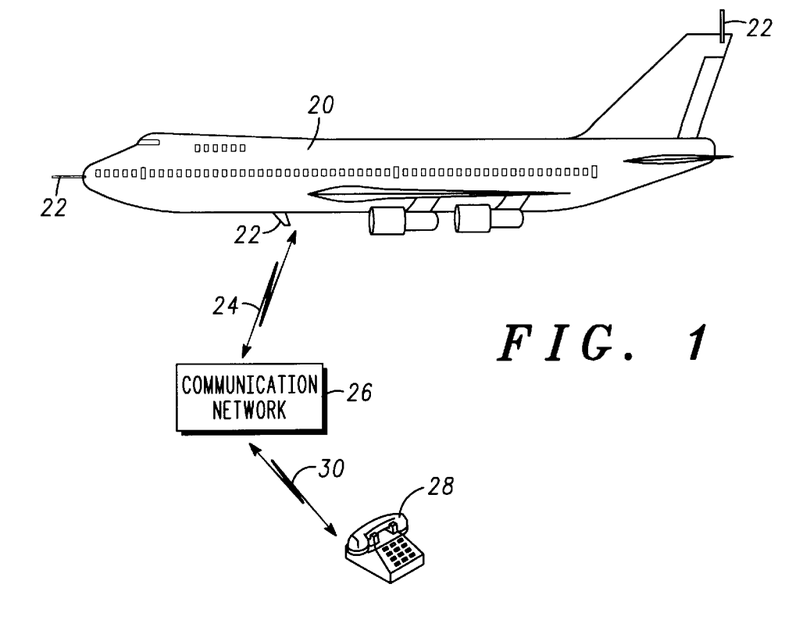
FIG. 1 shows a diagram of an exemplary aircraft and a radio communication system in which the present invention may be practiced.

FIG. 1 shows a diagram of an exemplary aircraft and a radio communication system that may be used to practice the present invention. Aircraft 20 is shown with several radio communication antennas 22 of various shapes and at various external locations on the aircraft. Radio antennas 22 are used to receive and/or transmit radio signals or radio channels 24 between aircraft 20 and communication network 26. In a preferred embodiment, communication network 26 is a cellular communication system, such as GSM for example. Communication network 26 is shown linked to phone 28, which represents any one or all of a wide variety of conventional telephonic devices, such as public, private and mobile phones or other telecommunication equipment. Phone 28 is linked to communication network 26 through communication channels 30. Communication channels 30 include radio channels, terrestrial phone lines, and/or any combination thereof.

Figure 2:
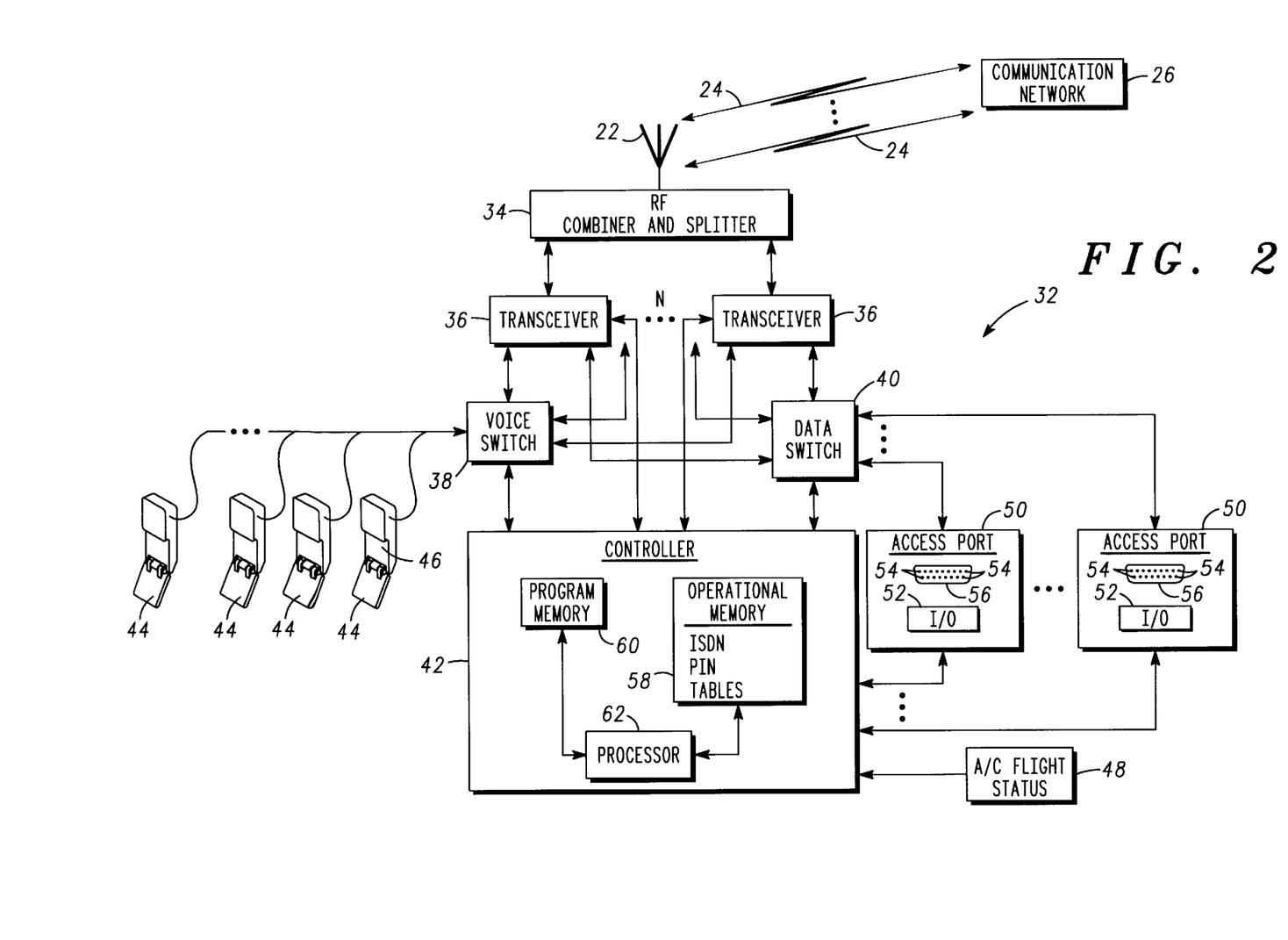
FIG. 2 shows a block diagram of an exemplary multi-channel subscriber exchange and a communication network in accordance with a preferred embodiment of the present invention.

FIG. 2 shows a block diagram of an exemplary multi-channel subscriber exchange 32 coupled to communication network 26 which provides communication and authentication services for subscribers. Exchange 32 is located on aircraft 20 (FIG. 1), and these services are provided to subscribers onboard aircraft 20. Multiple radio channels 24 carry audio and data received and/or transmitted by aircraft antennas 22. RF combiner/splitter 34 couples to at least one antenna 22 and processes radio channels 24 by combining outgoing radio channels for transmission and splitting incoming radio channels for reception. A quantity N, where N is an integer number, of transceivers 36 couple to combiner/splitter 34. Transceivers 36 are linked to voice switch 38, data switch 40, and controller 42. Voice switch 38 carries voice and data to and from any number of handsets 44. Each handset 44 is associated with I/O device 46 that may include a keypad, a visual display and an audible alert system. In the preferred embodiment, handsets 44 are located on passenger seat backs in aircraft 20. I/O device 46 functions as a subscriber or user interface so that the subscriber can supply information to and receive information from controller 42 and communication network 26. I/O device 46 can audibly alert the subscriber to an incoming call, and display a prompt for and accept entry of the subscriber's PIN. Voice switch 38 and handsets 44 are included in conventional aircraft telecommunication networks found on most modern commercial aircraft and are not discussed in detail herein.

Figure 4:
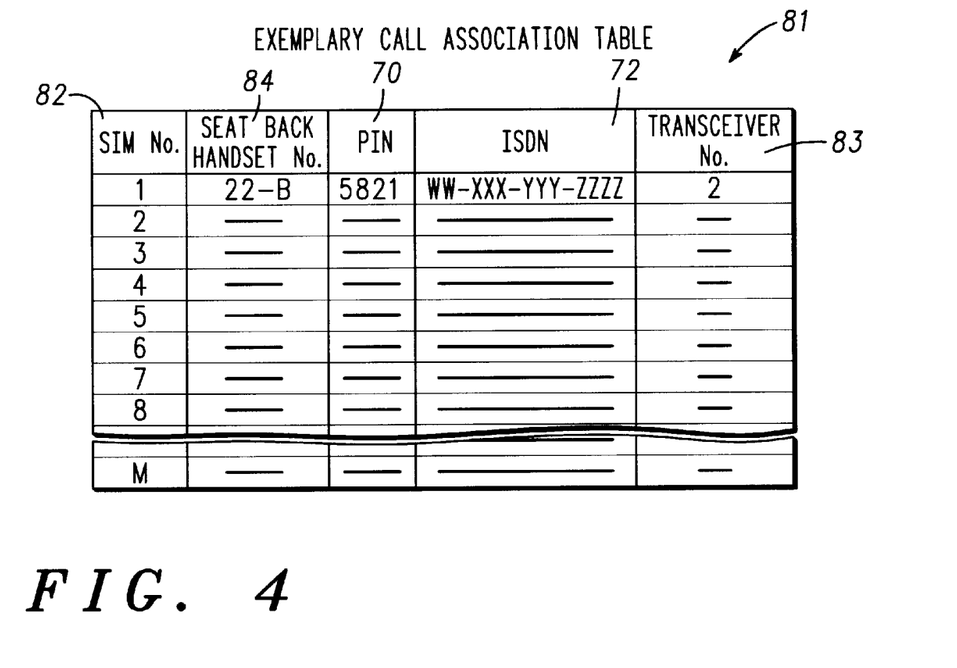
FIG. 4 shows an exemplary call association table in accordance with a preferred embodiment of the present invention.

Data switch 40 carries digital data to and from subscriber identity access ports 50. Each access port 50 or group of access ports 50 has I/O device 52, such as a keypad and/or display, that functions as a subscriber interface. Access ports 50 are positioned at different locations in aircraft 20 for different embodiments. To some degree, the location of access ports 50 determines how controller 42 associates handsets 44 with original SIMs 56. This association of handsets 44 and original SIMs 56 is shown in FIG. 4 and discussed in greater detail below. Each access port 50 may also have card locking mechanism 54 configured to hold a smart card or an original SIM 56, discussed below.

Figure 3:
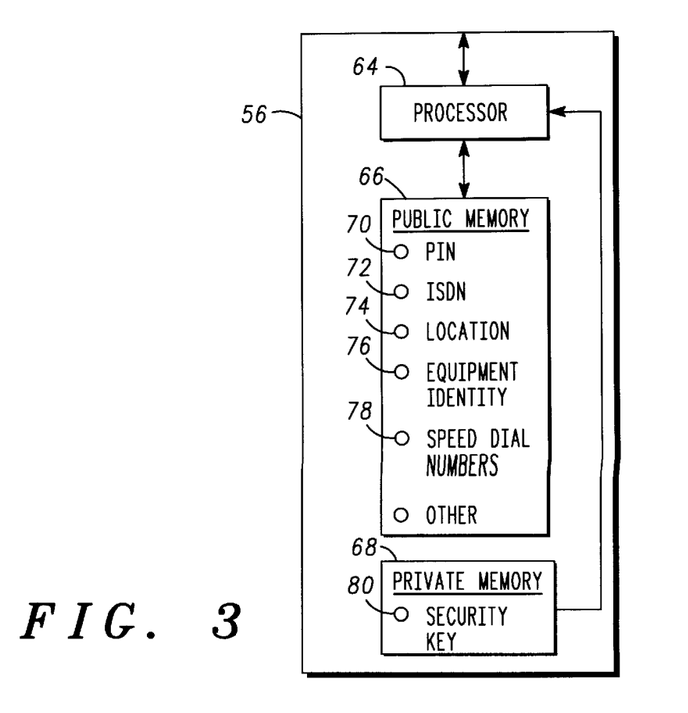
FIG. 3 shows a block diagram of an exemplary original SIM in accordance with a preferred embodiment of the present invention.

FIG. 3 shows an exemplary block diagram of original SIM 56. Original SIM 56 is a SIM card containing processor 64 coupled to public memory 66 and private memory 68. Public memory 66 allows external read and write access for storing such items as a subscriber's personal identification number (PIN) 70, a subscriber's international subscriber directory number (ISDN) 72, a subscriber's location 74, an equipment identity code 76, a list of subscriber speed dial numbers 78, and other subscriber specific information. PIN 70 is a subscriber unique numeric code that is used by exchange 32 to identify individual subscribers in a manner discussed in more detail below. Moreover, each subscriber has a unique phone number or ISDN 72 that is stored in public memory 66. Whenever reference is made to an ISDN, it also refers to an identity alias, such as temporary mobile subscriber identity or TMSI, for example. Subscriber location 74 stores a geographic location of original SIM 56 that is determined and updated by communication network 26. Equipment identity 76 stores a code that indicates the type of equipment with which original SIM 56 was last used.

Unlike public memory 66, private memory 68 has a cryptographic security key 80 that cannot be overwritten or read externally from original SIM 56 but is only readable by processor 64. Processor 64 uses an internal encryption process, security key 80 and a random number supplied by communication network 26 to perform a subscriber authentication process.

A SIM registration process occurs from time to time so that communication network 26 can learn the location of original SIM 56 and the radio equipment with which it is associated. The subscriber authentication process occurs as a part of this registration process. In addition, the registration process, including its embedded authentication process, takes place each time an incoming or outgoing call is set up. Accordingly, radio equipment, such as transceivers 36 (FIG. 2), are coupled to SIMs in order to provide communication and authentication services.

Original SIM 56 is distinguished from a temporary SIM for the purposes of the present invention. Original SIM 56 is owned by or otherwise in the possession of a subscriber to communication network 26 and identifies the party (i.e. the subscriber) that will be billed for services performed for that original SIM. This subscriber may, for example, be a passenger on aircraft 20 (FIG. 1). Unlike original SIM 56, the temporary SIM may exist in software form only within exchange 32 and is temporarily associated with a specified original SIM 56. Such an association is discussed in more detail below. The temporary SIM is possessed by the subscriber or passenger, although it is physically possessed by exchange 32. Moreover, the temporary SIM may, but need not, include all the features of original SIM 56. For example, the temporary SIM includes only ISDN 72 in one embodiment of the present invention and is stored in controller 42 (FIG. 2).

Referring back to FIG. 2, controller 42 includes program memory 60 and operational memory 58 coupled to processor 62. Operational memory 58 stores temporary information such as PINs 70, ISDNs 72 and various operating tables that are over-written or erased during the operation of exchange 32 during a flight and upon aircraft landing. An aircraft flight status indicator 48 of aircraft 20 is input to controller 42. Flight status is obtained from an aircraft avionics system. Flight status indicator 48 informs controller 42 whether aircraft 20 is in flight or has landed.

Program memory 60 contains more permanent information, such as computer software programs that select, associate, and couple transceivers 36 and access ports 50 to handsets 44. Unlike operational memory 58, information stored in program memory 60 is retained after flight termination. Processor 62 uses operational memory 58 and program memory 60 while performing functional processing required by subscriber exchange 32.

Subscriber exchange 32 accesses original SIMs 56 through access ports 50. Locking mechanism 54 is depicted in FIG. 2 with four compression clips that may be electrically activated to hold or lock original SIM 56 in access port 50. Those skilled in the art will realize that any of a variety of credit card type locking devices could be used as well. In one embodiment an integer quantity M of original SIMs 56 can be accessed through access ports 50. The quantity M is typically larger than the quantity N of transceivers 36. I/O device 52 is a user interface with communication network 26 and subscriber exchange 32, and which allows the subscriber to enter a PIN or other such access code as required.

Each of subscriber identity access port 50, voice switch 38 and data switch 40 couples to controller 42 and is controlled by controller 42. Thus, controller 42 makes numerous couplings and associations between access ports 50, original SIMs 56, temporary SIMs, transceivers 36 and handsets 44, as described in more detail below.

FIG. 4 shows an exemplary call association table 81 that is stored in operational memory 58 of controller 42 (FIG. 2). Table 81 is arranged to include a SIM number 82 in association with seat back handset number 84, corresponding to handset 44 (FIG. 2), PIN 70, ISDN 72, and transceiver number 83 corresponding to transceiver 36 (FIG. 2). SIM no. 82 is an index number that corresponds to a specific SIM. The specific SIM can be one of many original SIMs 56 inserted into access ports 50 (FIG. 2) or one of many temporary SIMs stored in program memory 60 (FIG. 2) or otherwise possessed by exchange 32. The coupling of transceivers 36 (FIG. 2) with seat back handset numbers 84 is tracked through the use of transceiver no. 82 in a manner discussed below.

Controller 42 (FIG. 2) assigns SIM no. 82 to the temporary SIMs and original SIMs 56 to track the association of each SIM with seat back handset no. 84. The association between SIM no. 82 and seat back handset no. 84 enables controller 42 to complete incoming and outgoing calls to individual subscribers after controller 42 couples selected transceiver 36 to an appropriate original or temporary SIM that is associated with seat back handset no. 84. For the example shown, table 81 indicates a SIM no. 82 (1) that has PIN 70 (5821) and ISDN 72 (ww-xxx-yyy-zzzz) and is associated with seat back handset no. 84 (22-B) coupled to transceiver no. 83 (2).

As mentioned before, the association between SIM no. 82 and seat back handset no. 84 can take different forms. In one embodiment access ports 50 (FIG. 2) are located at each seat back location, so that the above association is made when original SIM 56 is inserted into access port 50 (FIG. 2) located at the subscriber's seat back. In another embodiment, a group of access ports 50 are located together at a bulkhead in aircraft 20 and arranged or labeled so that each access port 50 corresponds to its own seat back handset no. 84. In yet another embodiment, several access ports 50 (FIG. 2) are available to subscribers as they enter aircraft 20 and the subscriber makes the association by inserting original SIM 56 into access port 50 and entering an assigned seat number through I/O device 52 (FIG. 2). In another alternative embodiment, a bulkhead SIM reader would be linked with a seatback via swipes of a credit card at both places. This would be an alternative to entering a seat number at the bulkhead or having a SIM carrier for each seat.

Figure 5:
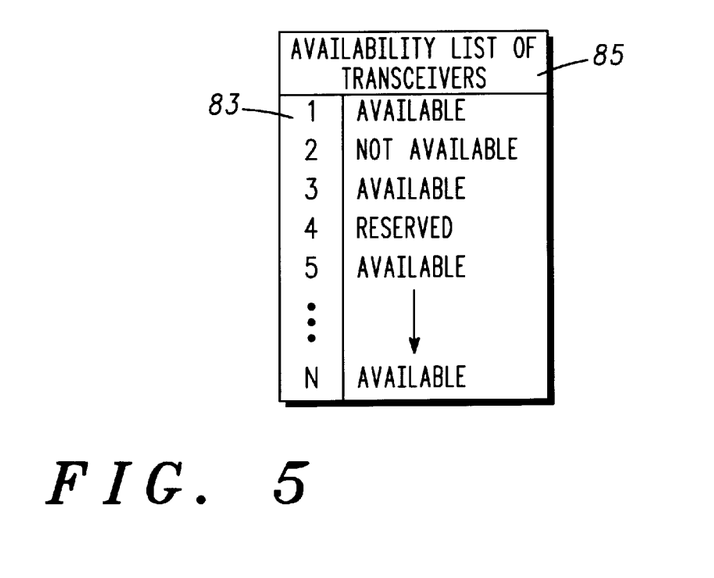
FIG. 5 shows an exemplary availability list of transceivers in accordance with a preferred embodiment of the present invention.

FIG. 5 shows an exemplary availability list of transceivers 85 maintained by controller 42 and stored in operational memory 58 (FIG. 2). An integer number M of subscribers, each having their own original SIM 56 that corresponds to a SIM no. 82 is shown in FIG. 4. The number M can be larger than the integer number N of transceivers 36 provided by exchange 32. Hence, there can be more subscribers M than transceivers N (FIGS. 4 and 5). Subscriber exchange 32 tracks availability of transceivers 36 and maintains availability list of transceivers 85. For the example shown in FIG. 5, one of transceiver nos. 83 (i.e. 2) is unavailable as it is being used by the subscriber having SIM no. 82 (1) and seat back handset 84 no. (22-B), as shown in FIG. 4. In the example presented in FIG. 5, another of transceiver nos. 83 (i.e. 4) is also unavailable and is shown as being reserved, possibly for placing emergency calls.

Figure 6:
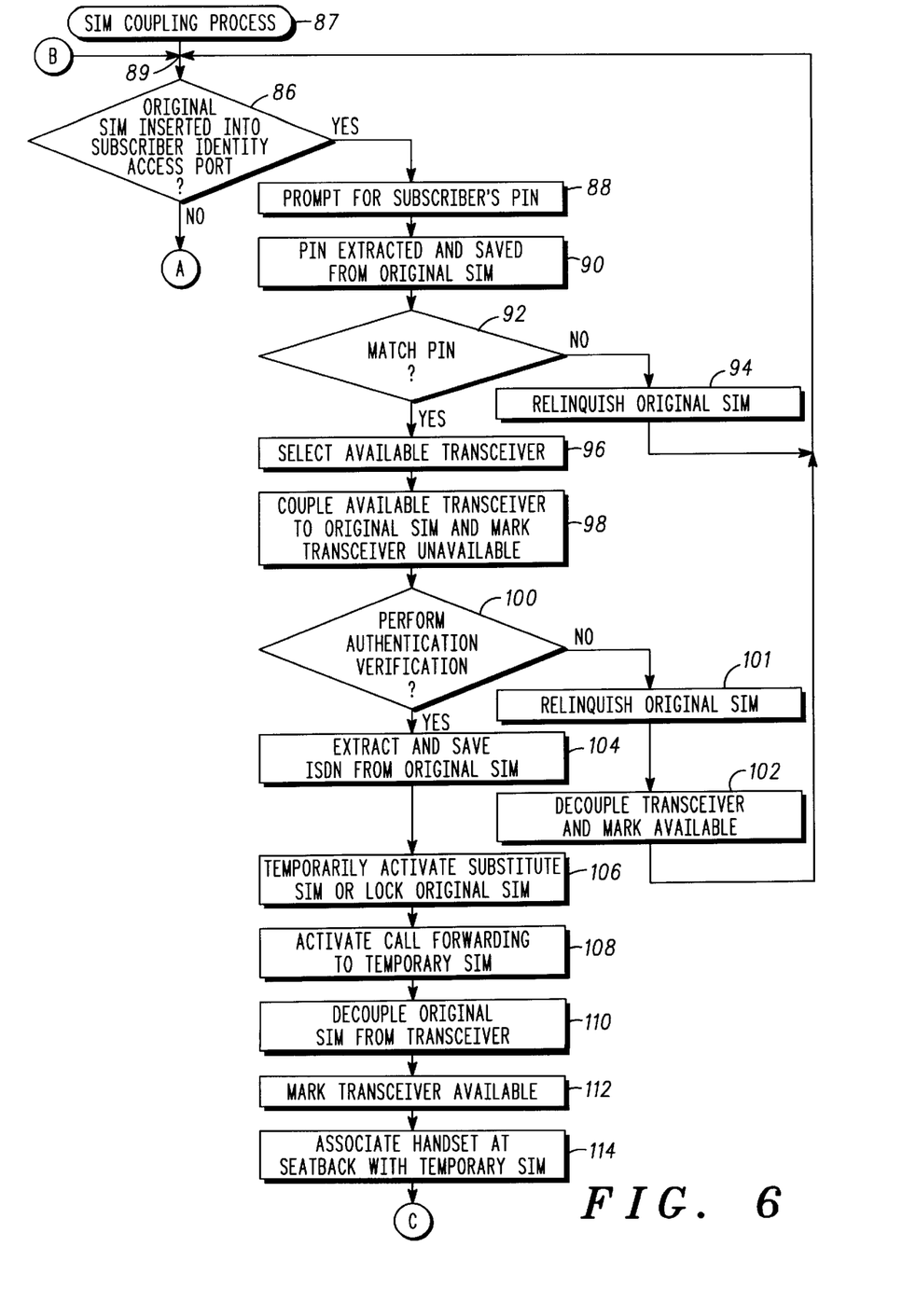
FIG. 6 shows a first part of a flowchart for an exemplary SIM coupling process in accordance with a preferred embodiment of the present invention.
Figure 7:
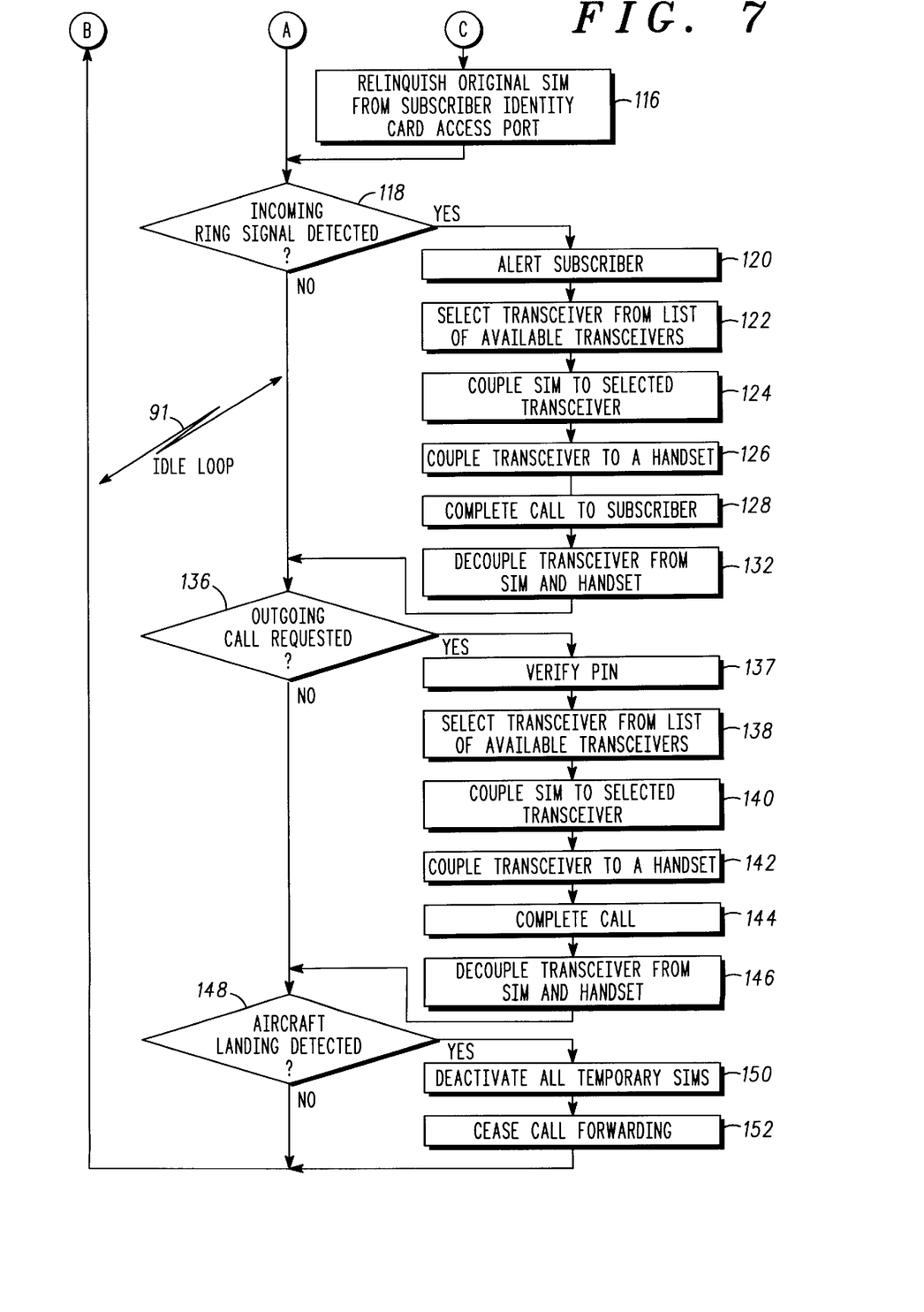
FIG. 7 shows a second part of a flowchart for the exemplary SIM coupling process in accordance with a preferred embodiment of the present invention.

FIG. 6 shows a flowchart of a first part of an exemplary SIM coupling process 87 that is used by subscriber exchange 32 in a preferred embodiment of the present invention. FIG. 7 shows a second part of process 87. FIG. 6 shows SIM coupling process 87 as beginning at an arbitrary starting point 89 in an idle loop 91. Idle loop 91 is a processing loop that includes query steps that direct processing control flow based on responses to query steps.

Within idle loop 91, query step 86 checks for the presence of a newly inserted original SIM 56 in one of access ports 50. When original SIM 56 is inserted into access port 50 (FIG. 2), query step 86 proceeds to step 88. Otherwise, process flow returns to idle loop 91, as indicated at a connector "A" which links idle loop 91 to the flowchart presented in FIG. 7.

During step 88, controller 42 prompts the subscriber to enter a PIN through I/O device 52 (FIG. 2). This prompt or request can be an audible beep followed by a display of words requesting that the user enter his or her PIN. Upon entry of the PIN by the subscriber, it is stored in memory 58. Following step 88 controller 42 (FIG. 2) extracts and saves PIN 70 (FIG. 3) from original SIM 56 (FIG. 2) in step 90. Upon the extraction of PIN 70, it is stored in table 81 (FIG. 4). Next, query step 92 compares, the subscriber-entered PIN to the extracted PIN 70 for a match. If no match is found, original SIM 56 is relinquished to the subscriber in step 94, and control flow returns to idle loop 91.

The relinquishing act may include unlocking lock mechanism 54 and/or prompting the user to retrieve original SIM 56 by issuing an audible or visual alert signal through I/O device 52. By relinquishing original SIM 56, the user is then allowed to retrieve original SIM 56 from access port 50.

If a match is found in step 92, controller 42 grants access to subscriber exchange 32 and uses a list of transceivers 85 (FIG. 5) to select an available transceiver 36 in step 96. An available transceiver is one that is marked as being available in table 85 (FIG. 5). Following step 96, the available transceiver 36 is coupled to original SIM 56, and that transceiver 36 is marked as being unavailable in the availability list of transceivers 85 (FIG. 5) in step 98. By coupling transceiver 36 with original SIM 56, exchange 32 establishes a one-to-one relation between original SIM 56 and transceiver 36, at least temporarily. Transceiver 36 is coupled to original SIM 56 by controlling data switch 40 to connect selected access port 50 with selected transceiver 36.

Following step 98, exchange 32 and communication network 26 perform a conventional authentication verification process on original SIM 56 (not shown). The results of that authentication process are evaluated in query step 100.

If communication network 26 does not verify the authentication of original SIM 56 during the authentication process, program control proceeds to step 101. During step 101, original SIM 56 is relinquished to the user in the manner described above in connection with step 94. Following step 101, step 102 decouples transceiver 36, breaking the one-to-one relationship between transceiver 36 and original SIM 56. Step 102 decouples transceiver 36 by sending disconnecting commands to data switch 40 and by erasing the transceiver no. 83 associated with the original SIM no. 82 in table 81 (FIG. 4). In addition, step 102 marks that transceiver 36 as now being available on list 85 (FIG. 5) and program flow then returns to idle loop 91.

If authentication is verified in step 100, step 104 extracts and saves ISDN 72 in table 81 (FIG. 4). ISDN 72 is extracted from original SIM 56. In addition, step 104 may update original SIM 56 (not shown). In updating original SIM 56, the current geolocation 74 (FIG. 3) may be stored to original SIM 56. A current geolocation can be determined as a part of the registration process. Geolocation information can be used to determine when to perform the registration process so that the system is kept informed of the original SIM's location and the system can then accurately direct incoming ring signals to the original SIM. In addition, in updating original SIM 56, equipment identity 76 (FIG. 3) is desirably stored on original SIM 56 to identify transceivers 36 and exchange 32. If radio equipment used in communication network 26, including exchange 32, finds an original SIM 56 having an equipment identity 76 incompatible with its own equipment identity, then this event can provide a registration process so that communication network 26 is kept informed of the equipment type with which an original SIM is being used, and the system can then accurately direct appropriate incoming ring signals to the original SIM.

In one embodiment, controller 42 forms and/or activates a substitute or temporary SIM in step 106. A temporary SIM may be formed or activated merely by storing ISDN 72 in table 81 so that it is associated with a specified seat back handset no. 84.

Alternatively, a fully functional actual or simulated temporary SIM which is in the possession of exchange 32 may be activated and an index number of such a temporary SIM stored in table 81 in association with a specified seat back handset no. 84. In this embodiment, the temporary SIM has its own ISDN 72, security key 80, and processing capability to perform the authentication process. That processing capability may be, but is not required to be, provided by processor 62 of controller 42 (FIG. 2). In either embodiment, an association is established indicating that the temporary SIM corresponds to original SIM 56. When M original SIMs 56 are being serviced by exchange 32, M temporary SIMs are activated to correspond to the M original SIMs.

Step 106 also indicates that original SIM 56 may be locked into access port 50 in the manner discussed above. Original SIMs 56 are desirably locked in access ports 50 in an embodiment of the present invention which does not use temporary SIMs. This embodiment is described in more detail below. Original SIMs 56 may, but need not, be locked in access ports 50 when temporary SIMs are used because they will soon be relinquished.

Following step 106, controller 42 activates call forwarding when the temporary SIM has its own ISDN 72 by instructing network 26 to forward calls directed to original SIM 56 on to the temporary SIM in step 108. In addition, step 108 may instruct network 26 to transfer billings for the temporary SIM over to the subscriber's original SIM 56. After completing step 108, the selected transceiver 36 is decoupled from original SIM 56 in step 110, and the selected transceiver 36 is marked available on list 85 of transceivers (FIG. 5) in step 112. Steps 110 and 112 operate in a manner similar to step 102, discussed above.

After step 112, step 114 causes controller 42 to associate seat back handset no. 84 (FIG. 4) with the temporary SIM that has been activated to correspond with the original SIM 56. Step 114 is performed by making an appropriate entry in table 81. In addition, ISDN 72 stored in table 81 in association with the seat back handset no. 84 and SIM no. 82 may be set to the ISDN of the temporary SIM rather than the ISDN from the original SIM 56. Following step 114, original SIM 56 is relinquished from access port 50 in step 116, and program flow returns to idle loop 91.

The subscriber may maintain possession of his or her original SIM 56. Communication services, including outgoing and incoming calls will be provided using the temporary SIM in a manner discussed below. Since the subscriber can maintain possession of his or her original SIM 56, the subscriber is unlikely to accidentally leave original SIM 56 behind when departing airplane 20 and system security remains high. Authentication security has been extended from original SIM 56 to the temporary SIM which will be used for that subscriber throughout the duration of the flight.

FIG. 7 shows a second part of SIM coupling process 87. Idle loop 91 continues in FIG. 7 as indicated through connectors "A" and "B". Within idle loop 91, controller 42 monitors or screens incoming ring signals for conveyed ISDNs matching ISDNs 72 from call association table 81 (FIG. 4) in query step 118. The ring signals are received at one or more of transceivers 36 over a control or broadcast channel. The one or more transceivers 36 which monitor the control or broadcast channel decode the ring signals and then pass ring signal or page messages along to controller 42.

When step 118 identifies a match, the subscriber is alerted to an incoming call through I/O device 46 of handset 44 in step 120. A particular handset 44 is identified through the seat back handset no. 84 associated in table 81 (FIG. 4) with ISDN 72 conveyed by the just-detected ring signal. The subscriber may be alerted by an audible or visual signal emitted by I/O device 46. After step 120, transceiver 36 is selected from list 85 (FIG. 5) in step 122. Step 122 operates in a manner similar to that discussed above in connection with step 96 (FIG. 6).

Following step 122, controller 42 couples the selected transceiver 36 with the corresponding SIM in step 124. The corresponding SIM to which the selected transceiver 36 is coupled can be the temporary SIM whose index number is associated with the just-detected ISDN 72 in table 81 (FIG. 4). In another embodiment discussed below, the corresponding SIM can be an original SIM 56 whose index number is associated with the just-detected ISDN 72 in table 81. For the temporary SIM, this coupling simulates the coupling performed in step 98, where transceiver 36 was physically coupled to original SIM 56. Otherwise, this coupling is substantially similar to that discussed above in connection with step 98.

Following step 124, seat back handset 44 identified by call association table 81 is coupled to the selected transceiver 36 in step 126. Step 126 couples the selected handset 44 and transceiver 36 together through appropriate control of voice switch 38 (FIG. 2). After step 126, step 128 is performed while the incoming call to the subscriber is underway. When the call is completed, step 132 decouples the selected transceiver 36 from the SIM and seat back handset 44. When step 132 decouples transceiver 36, it is marked as available on list 85 of transceivers (FIG. 5), and control flow returns to idle loop 91.

Returning to step 118, when the ISDNs of incoming ring signals do not match any of ISDNs 72 in table 81 (FIG. 4), program flow continues through idle loop 91 to query step 136 to monitor for outgoing calls. A request for making an outgoing call is detected by controller 42 when a user appropriately manipulates I/O device 46 (FIG. 2). If controller 42 does not detect a request for an outgoing call, program flow continues in idle loop 91.

However, if a request for an outgoing call is detected, controller 42 verifies the subscriber's PIN in step 137. The subscriber's PIN may be verified in a manner similar to that discussed above in connection with steps 88 and 92 (FIG. 6). The user is prompted to enter the PIN, and the user-entered PIN is checked against PIN 70 listed in table 81 in association with the seat back from where the request for an outgoing call originates. If the subscriber's PIN is not verified, then the request for making an outgoing call is denied, and program flow returns to idle loop 91 (not shown). Thus, step 137 extends authentication security by preventing persons who are unlikely to know the correct PIN from using another's services while on aircraft 20 even when the original SIM 56 has been relinquished and communication and authentication are being provided using a more public temporary SIM.

When the subscriber's PIN is verified, controller 42 selects a transceiver 36 from list 85 (FIG. 5) in step 138. Transceiver 36 is selected in substantially the same manner as discussed above in connection with steps 96 and 122. Following step 138, step 140 couples the SIM whose index number 82 (FIG. 4) is associated with the seat back requesting the outgoing call to the selected transceiver 36. This coupling occurs through data switch 40 or by simulation of a SIM (i.e. a temporary SIM) in controller 42. Following step 140, step 142 couples the selected transceiver 36 to the appropriate seat back handset 44 as determined from call association table 81 (FIG. 4). This coupling occurs through voice switch 38. Next, step 144 is performed while the outgoing call is underway. When the call is completed, step 146 decouples the selected transceiver 36 from the SIM and seat back handset 44. When step 146 decouples transceiver 36, it is marked as available on list 85 of transceivers (FIG. 5), and control flow returns to idle loop 91.

Idle loop 91 also includes query step 148 that monitors aircraft 20 for a landing condition as determined through the input of flight status indicator 48 (FIG. 2). When no landing condition is detected, program flow continues through idle loop 91. When a landing condition is eventually detected, all temporary SIMs are deactivated or erased in step 150. Following step 150, subscriber exchange 32 instructs communication network 26 to cease call forwarding in step 152 and to transfer billing activity for the temporary SIM away from the previously corresponding original SIM 56. After step 152, program flow returns to idle loop 91. The deactivating of temporary SIMs and call forwarding and the transferring of billing activity breaks the previously established associations or correspondence between original SIMs 56 and temporary SIMs. Thus, the extension of authentication security provisions from original SIMs to temporary SIMs continues only for a limited time and no significant weakening of system security results.

Those skilled in the art will appreciate that process 87, discussed above in connection with FIGS. 6 and 7, may be performed concurrently for any number of original SIMs 56, and particularly for a number M of original SIMs 56 which is greater than the number N of transceivers 36 provided by exchange 32. Thus, a one-to-one correspondence between SIMs and transceivers 36 is not continuously required, and a pool of transceivers 36 may be efficiently used to securely provide public communication services for a greater number of subscribers.

As discussed above, in one alternate embodiment of the present invention a temporary SIM may consist merely of ISDN 72 extracted from an original SIM 56. In this embodiment, the temporary SIM allows exchange 32 to provide a paging communication service for the subscriber even though an original SIM 56 is not present. Above-described step 108 is omitted and no call forwarding is performed. However, this ISDN is associated with a seat back handset no. 84 in table 81 (FIG. 4), and the subscriber's original SIM 56 is nevertheless relinquished in step 116. Thus, the subscriber may keep original SIM 56 in his or her possession at all times so that system security remains intact.

For this embodiment, when an incoming call's ISDN matches an ISDN 72 from table 81 (FIG. 4), the subscriber is alerted to the incoming call as in step 120. However, after alerting the subscriber, controller 42 waits for up to a predetermined duration after step 120 to allow the subscriber to reinsert original SIM 56 into access port 50 (FIG. 2). Accordingly, exchange 32 reaccesses the subscriber's original SIM 56 while waiting after step 120. The call setup process will then use the subscriber's original SIM 56 accessed through access port 50 to provide the additional communication services of call setup and voice communication as process 87 continues with step 122.

In this embodiment, when a subscriber desires to place a call the subscriber reinserts original SIM 56 into access port 50 (FIG. 2) before call setup. Step 137 may be omitted, but call setup continues with step 138 and uses the subscriber's original SIM 56. After steps 132 or 146, a relinquishing step similar to steps 94 and 116 (FIG. 6) can be performed because the subscriber has reinserted original SIM 56 into access port 50. Moreover, for this embodiment, when a landing condition is detected, step 150 erases only PIN 70 and ISDN 72 from table 81 to deactivate the temporary SIM. Since no call forwarding was performed, step 152 may be omitted.

In another embodiment of the present invention, no substitute or temporary SIM is activated. Accordingly, above-described step 106 locks original SIMs 56 into access ports 50 as discussed above. Steps 108 and 116 (FIG. 6) are omitted from SIM coupling process 87. Since original SIMs 56 are locked, the subscribers may have confidence that their original SIMs 56 will not be stolen and system security remains high. Since they remain at access ports 50, they are available for use in connection with registration, incoming calls, and outgoing calls. In steps 124, 132, 140, and 146, the SIMs being coupled and decoupled are the original SIMs 56 which are locked in place at access ports 50. Steps 148, 150, and 152 may be omitted. Associations between SIMs and seat backs may be broken when the subscribers regain possession of their original SIMs 56.

Figure 8:
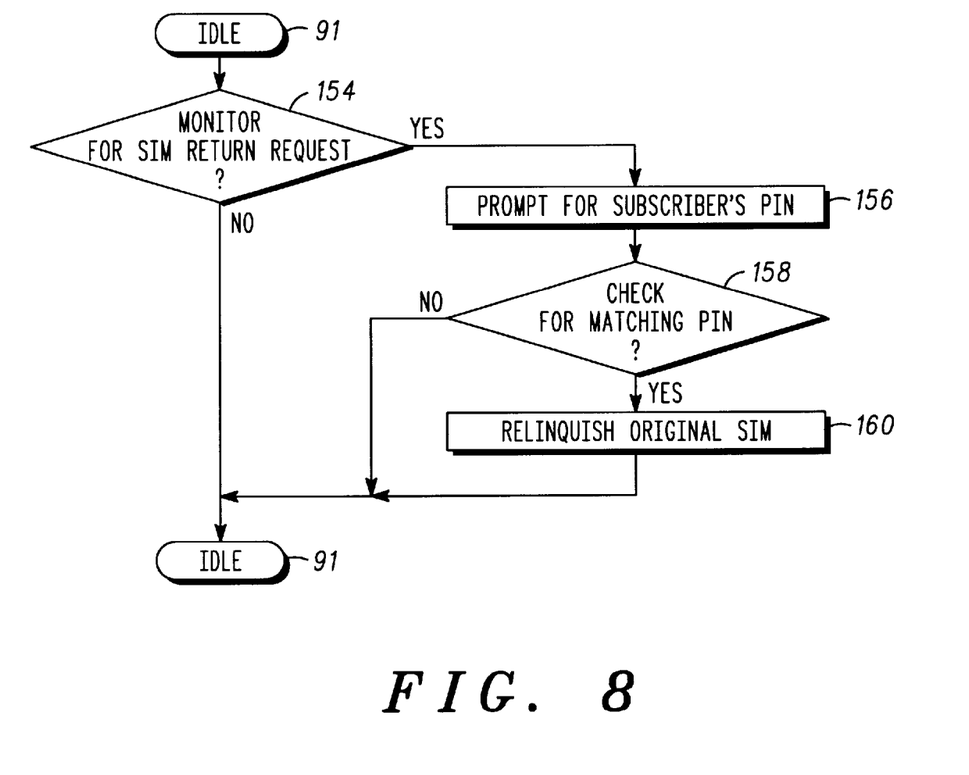
FIG. 8 shows a flowchart of an exemplary SIM relinquishing process in accordance with a preferred embodiment of the present invention.

FIG. 8 shows a flowchart of an exemplary SIM relinquishing process which is included in idle loop 91 and performed for the embodiment of the present invention where original SIMs 56 remain locked in place at access ports 50. Accordingly, idle loop 91 causes program flow to proceed to query step 154. Step 154 monitors for a request to relinquish original SIM 56 from access port 50. That request may come from the subscriber or from another source, such as aircraft personnel. If no such request is detected, program flow returns to idle loop 91.

When a return original SIM 56 request is detected, step 156 issues a prompt for the subscriber's PIN through I/O device 46 or 52 (FIG. 2). After the subscriber enters his or her PIN, query step 158 checks the entered PIN to see if it matches a PIN 70 from table 81 (FIG. 4). When a match is detected, controller 42 unlocks locking mechanism 54 for the corresponding original SIM 56 and relinquishes original SIM 56 in step 160, then program flow returns to idle loop 91. If the subscriber enters a PIN that does not match PIN 70, original SIM 56 remains locked in access port 50 and program flow continues through idle loop 91. Aircraft personnel may have access to an overriding code that could be used to help passengers retrieve their original SIMs should they forget their PINs.

In summary, a multi-channel subscriber exchange 32 provides authentication and communication services to subscribers through transceivers 36. Original SIM 56 is used for authentication purposes without significantly weakening conventional security. Authentication and communication services are provided without imposing the inefficiency of a one-to-one correspondence between SIMs and transceivers.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for operating an aircraft subscriber exchange that couples to a network providing communication and authentication services, the method comprising the steps of:

(a) receiving an original subscriber identity module (SIM) with an access port of the aircraft subscriber exchange;

(b) accessing subscriber-specific data from said original SIM received with said access port;

(c) performing an authentication process with the network using said original SIM;

(d) extracting said subscriber-specific data from said original SIM:

(e) establishing an association between said original SIM and a temporary SIM, said association extending said subscriber-specific data of said original SIM to said temporary SIM;

(f) relinquishing said original SIM from said access port;

(g) providing communication services for said original SIM using said temporary SIM; and (h) deactivating said temporary SIM based upon detection of a predefined event related to control of an aircraft.

2. The method for operating an aircraft subscriber exchange as recited in claim 1, wherein
said predefined event is a landing of said aircraft.

3. The method for operating an aircraft subscriber exchange as recited in claim 2, wherein
step (h) includes instructing the network to cease forwarding calls directed to the original SIM on to the temporary SIM.

4. The method for operating an aircraft subscriber exchange as recited in claim 1, wherein:
the network provides communication services for subscribers over channels;
steps (a)–(g) are repeated for a quantity M of said temporary SIMs and a quantity M of said original SIMs, where M is an integer number; and
said communication services are provided through a quantity N of transceivers, where N is an integer number less than M.

5. The method for operating an aircraft subscriber exchange as recited in claim 4, wherein step (g) includes the steps of:

(i) selecting one of said temporary SIMs and one of said transceivers; ad (j) coupling said selected one of said temporary SIMs and said one of said transceivers.

6. The method for operating an aircraft subscriber exchange as recited in claim 1, wherein
said subscriber-specific data from said original SIM includes a personal identification number (PIN); and
the method further comprises the step of prompting for entry of said PIN after step (f) and prior to step (g).

7. The method for operating an aircraft subscriber exchange as recited in claim 1, wherein said subscriber-specific data from said original SIM includes an international subscriber directory number (ISDN) and step (d) includes extracting said ISDN from said original SIM, and the method further comprises the steps of:

(i) monitoring incoming ring signals which convey ISDNs; and (j) screening said ISDNs conveyed with said incoming ring signals for a match with an ISDN of said temporary SIM.

8. The method for operating an aircraft subscriber exchange as recited in claim 7, wherein step (g) includes alerting a subscriber when step (j) detects said match with said temporary SIM, and the method further comprises the steps of:

(k) waiting a predetermined duration following the alerting step to allow the subscriber to provide said original SIM;

(l) reaccessing said subscriber-specific data from said original SIM during step (k); and (m) providing additional communication services in response to step (l).

9. The method for operating an aircraft subscriber exchange as recited in claim 1, wherein:
the exchange includes a plurality of handsets through which said communication services can be provided; and
step (e) includes associating one of said plurality of handsets with said temporary SIM.

10. A method for operating an aircraft subscriber exchange that couples to a network providing communication and authentication services for subscribers over channels, the method comprising the steps of:

(a) receiving a quantity M of original subscriber identity modules (SIMs) with a plurality of access ports of the aircraft subscriber exchange, where M is an integer;

(b) accessing subscriber-specific data from said quantity M of original subscriber identity modules SIMs;

(c) performing an authentication process with the network for each of said quantity M of original SIMs;

(d) extracting said subscriber-specific data from said quantity M of original SIMs;

(e) establishing an association between each of said quantity M of original SIMs and a quantity M of temporary SIMs, said association extending said subscriber-specific data of each of said quantity M of original SIMS on to one of said quantity M of temporary SIMs;

(f) relinquishing said quantity M of original SIMs from said plurality of access ports;

(g) controlling no more than a quantity N of transceivers where N is an integer number less than M;

(h) selecting, after step (f), one of said quantity M of temporary SIMs and one of said quantity N of transceivers;

(i) coupling the selected temporary SIM and the selected transceiver together;

(j) providing communication services for one of said quantity M of original SIMs using said one of said quantity M of temporary SIMs and one of said quantity N of transceivers selected in step (h); and (k) deactivating said quantity M of temporary SIMs based upon detection of a predefined event related to the control of an aircraft.

11. The method for operating an aircraft subscriber exchange as recited in claim 10, wherein:
said quantity M of original SIMs store personal identification numbers (PINs);

step (d) includes extracting said PINs from said quantity M of original SIMs; and the method further comprises the step of prompting for entry of said PINs.

12. The method for operating an aircraft subscriber exchange as recited in claim 10, wherein:

the aircraft subscriber exchange includes a plurality of handsets through which said communication services can be provided; and step (h) comprises the step of associating a selected one of said plurality of handsets with said selected one of said quantity M of temporary SIMs; and step (i) couples said selected one of said plurality of handsets to the selected transceiver.

13. A multi-channel subscriber exchange of an aircraft coupled to a network that provides communication and authentication services for subscribers over channels, the multi-channel subscriber exchange of the aircraft comprising:

a plurality of transceivers;

an access port;

a temporary subscriber identity module (SIM);

a controller connected to said plurality of transceivers, said access port, and said temporary SIM, said controller being configured to:

access subscriber-specific data from an original SIM received by said access port and perform an authentication process with the network using said original SIM;

extract said subscriber-specific data from said original SIM received by said access port;

establish an association between said original SIM and said temporary SIM, said association extending said subscriber-specific data of said original SIM to said temporary SIM relinquish said original SIM from said access port;

couple said temporary SIM to one of said plurality of transceivers to provide the communication services using said temporary SIM; and deactivate said temporary SIM based upon detection of a predefined event related to the control of the aircraft.

14. The multi-channel subscriber exchange of an aircraft as recited in claim 13, wherein:

said predefined event is an aircraft landing.

15. The multi-channel subscriber exchange of an aircraft as recited in claim 13, wherein:

said original SIM is one of a quantity M of original SIMs, where M is an integer number;

said temporary SIM is one of a quantity M of temporary SIMs; and said plurality of transceivers are of a quantity N, where N is an integer number less than M.

16. The multi-channel subscriber exchange of an aircraft as recited in claim 13, wherein the exchange includes a plurality of handsets and said controller is configured to associate one of said plurality of handsets with said temporary SIM.

17. The method for operating an aircraft subscriber exchange as recited in claim 1, further comprising the step of instructing the network to forward communication services directed to said original SIM on to said temporary SIM utilizing said association extending said subscriber-specific data of said original SIM to said temporary SIM.

18. The method for operating an aircraft subscriber exchange as recited in claim 10, farther comprising the step of instructing the network to forward communication services directed to said quantity M of original SIMs on to said quantity M of temporary SIMs utilizing said association extending said subscriber-specific data of each of said quantity M of original SIMs to said quantity M or temporary SIMs.

19. The multi-channel subscriber exchange of an aircraft as recited in claim 13, wherein the controller is further configured to instruct the network to forward communication services directed to said original SIM on to said temporary SIM utilizing said association extending said subscriber-specific data of said original SIM to said temporary SIM.

* * * * *

UNITED STATES PATENT AND TRADEMARK OFFICE
CERTIFICATE OF CORRECTION

PATENT NO. : 6,002,929
DATED : December 14, 1999
INVENTOR(S) : James William Bishop, Jr. et al.

It is certified that error appears in the above-identified patent and that said Letters Patent is hereby corrected as shown below:

On the front page, after "[73] Assignee:" replace "Mototrola, Inc." with --Motorola, Inc.--.

Column 11, line 54, after "transceivers;", replace "ad" with --and--.

Signed and Sealed this

Tenth Day of April, 2001

Attest:

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,002,929 | |
| APPLICATION NO. | : 08/939890 | |
| DATED | : December 14, 1999 | |
| INVENTOR(S) | : Bishop, Jr. et al. | |

It is certified that error appears in the above-identified patent and that said Letters Patent is hereby corrected as shown below:

On the title page:

[75] Please add inventor --Robert T. Frederick--

Signed and Sealed this

Nineteenth Day of August, 2008

JON W. DUDAS
*Director of the United States Patent and Trademark Office*